J. F. HEALY.
ENSILAGE HARVESTER AND CUTTER.
APPLICATION FILED JAN. 24, 1917.
1,245,458.
Patented Nov. 6, 1917.
3 SHEETS—SHEET 1.
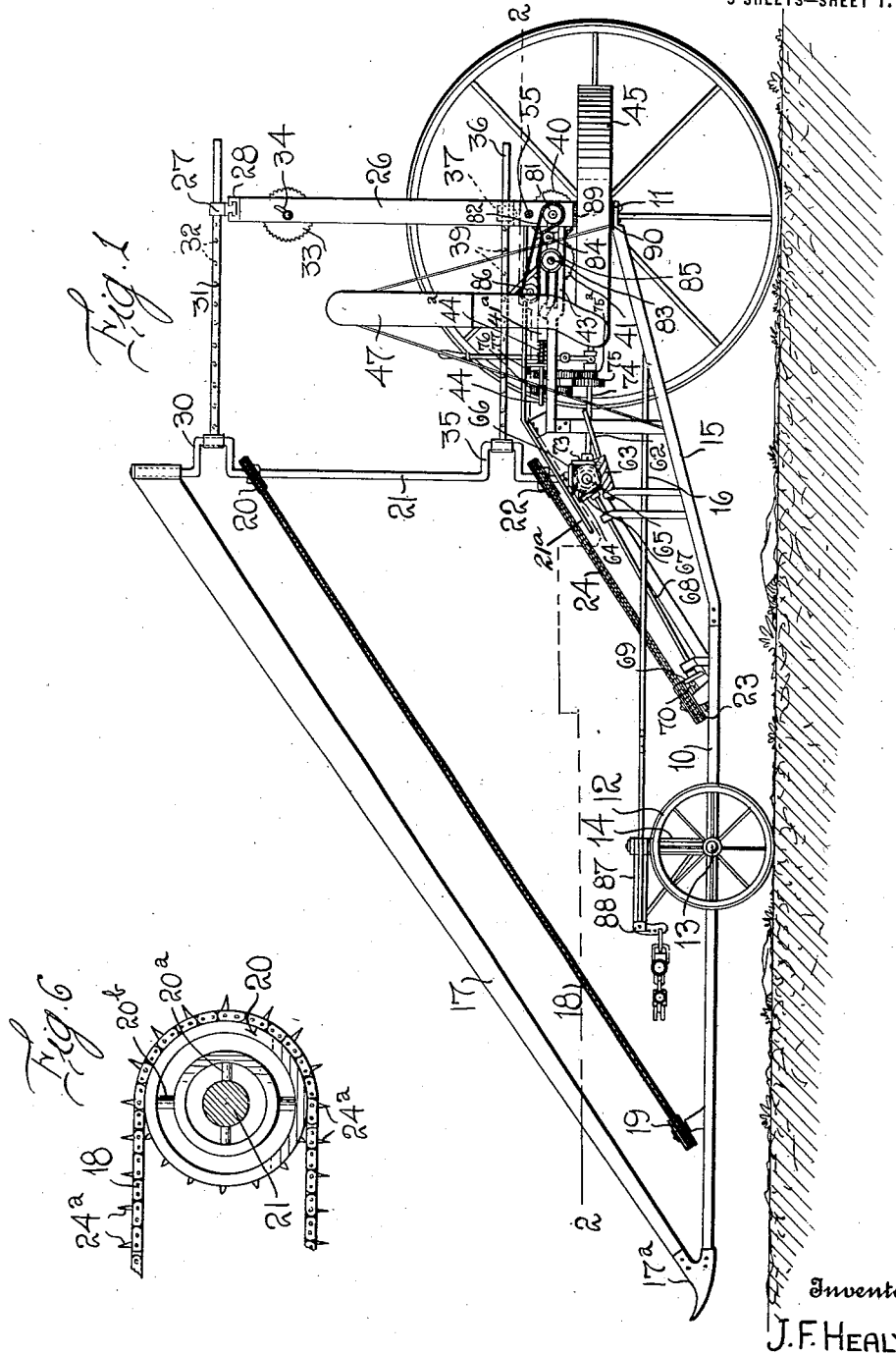
Inventor
J. F. Healy
By Watson E. Coleman
Attorney

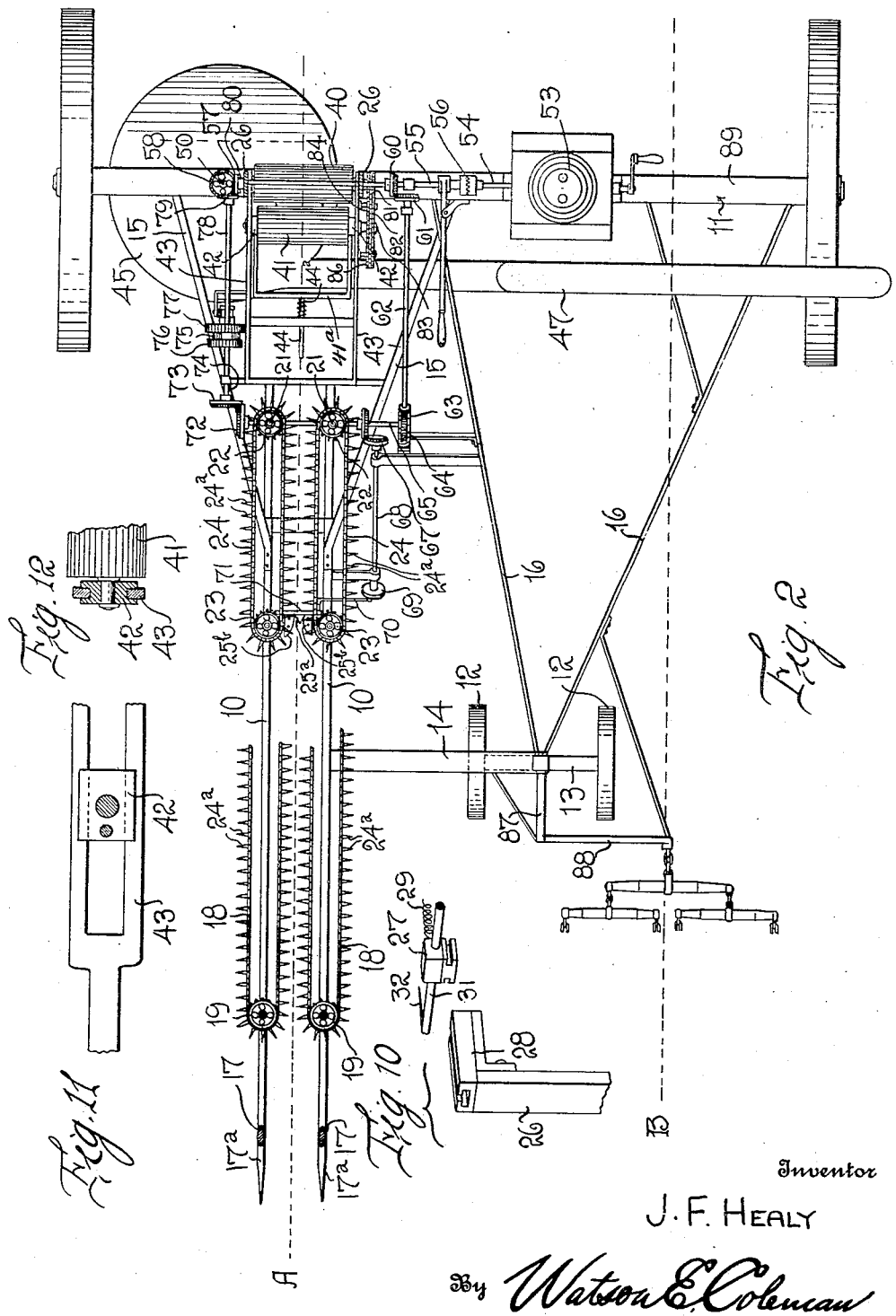

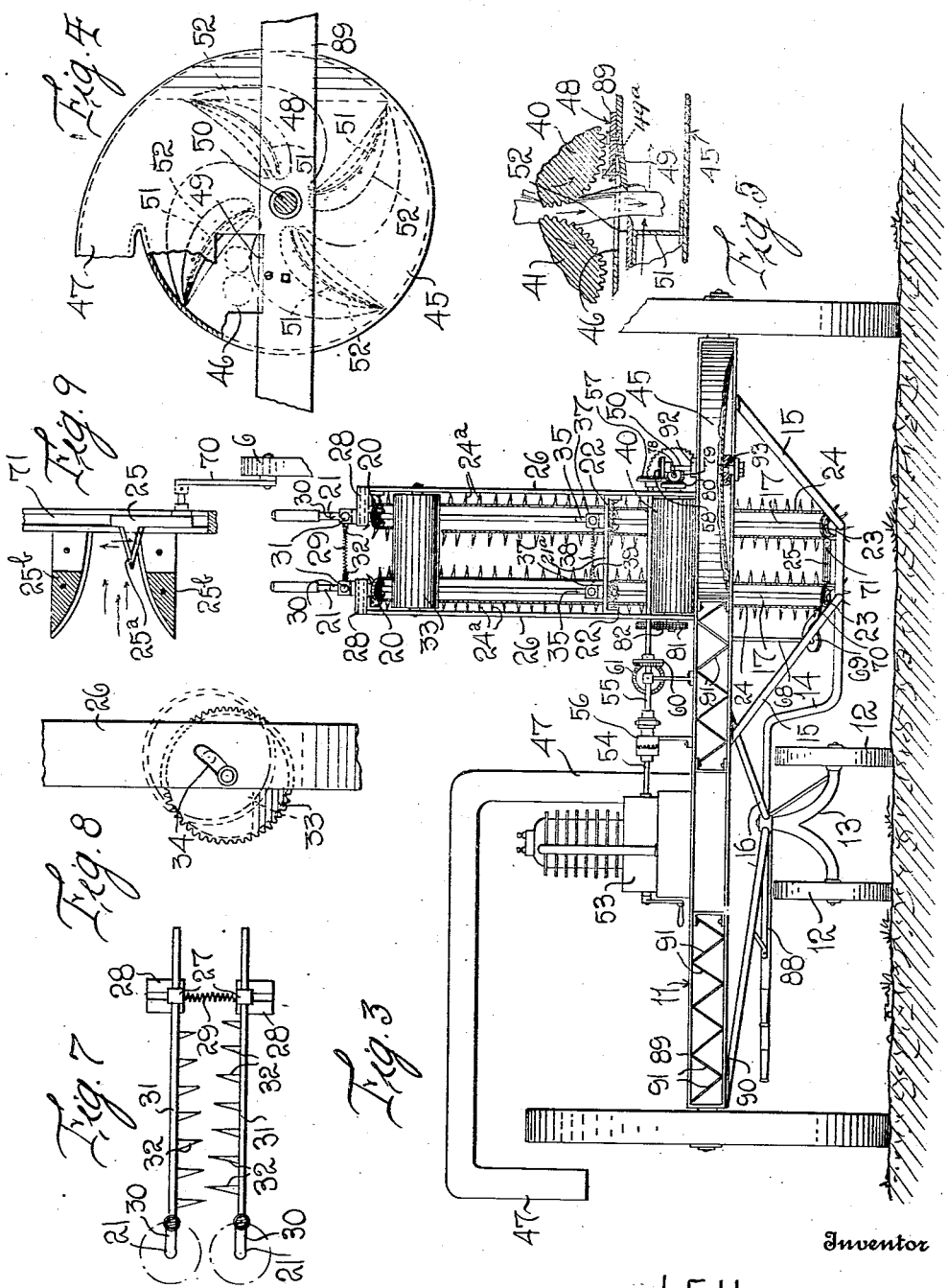
J. F. HEALY.
ENSILAGE HARVESTER AND CUTTER.
APPLICATION FILED JAN. 24, 1917.
1,245,458.
Patented Nov. 6, 1917.
3 SHEETS—SHEET 3.
Inventor
J. F. Healy
By Watson E. Coleman
Attorney

UNITED STATES PATENT OFFICE.

JOSEPH F. HEALY, OF IRENE, SOUTH DAKOTA.

ENSILAGE HARVESTER AND CUTTER.

1,245,458.   Specification of Letters Patent.   Patented Nov. 6, 1917.

Application filed January 24, 1917. Serial No. 144,236.

*To all whom it may concern:*

Be it known that I, JOSEPH F. HEALY, a citizen of the United States, residing at Irene, in the county of Yankton and State of South Dakota, have invented certain new and useful Improvements in Ensilage Harvesters and Cutters, of which the following is a specification, reference being had to the accompanying drawings.

This invention relates to agricultural machinery and particularly to machines for gathering corn and other standing crops intended for ensilage. At the present time crops intended for ensilage are harvested, carried to the silo, there chopped or sliced, and then the chopped material is disposed within the silo.

The primary object of this invention is to provide a machine in which crops intended for ensilage may be cut or harvested, the stalks sliced into small pieces and the sliced or chopped material deposited by pneumatic means in a wagon or other conveyance to be hauled to the silo. This operation saves the time ordinarily used in cutting the crop, hauling it to the cutter at the silo, cutting it to pieces at the silo, and then feeding it into the silo.

A further object is to provide a machine in which plants such as corn for instance, after being cut are carried upward in a vertical position and then fed downward against rotatable cutting knives which slice the plant up, a blower being provided for blowing the chopped or sliced material into a wagon following along at the side of the machine.

Still another object is to provide, in connection, with the machine of the character described, means for holding the stalks of the plant in a vertical position after they have been cut and while they are moving upward and provide means which will lift those plants or stalks which are bent over so that they are properly presented to the means which feeds the stalks to the slicers.

A further object is to provide means for shifting a mass of stalks, disposed in a vertical position, gradually rearward over feeding rollers and then allowing the stalks to drop downward between the feeding rollers, provision being made for accommodating increase or decrease in the mass of stalks which are fed to the machine.

Further objects have to do with improving the details of construction of machines of this character.

My invention is illustrated in the accompanying drawings, wherein—

Figure 1 is a side elevation of my improved ensilage cutting machine;

Fig. 2 is a horizontal section on the line 2—2 of Fig. 1;

Fig. 3 is a rear elevation;

Fig. 4 is a top plan view of the blower casing partly broken away, the shaft of the blower being shown in section;

Fig. 5 is a fragmentary vertical section through the blower casing and the feeding rollers;

Fig. 6 is a plan view of one of the sprocket wheels supporting the chains 18;

Fig. 7 is a top plan view of the reciprocating feed members and the sliding bearings therefor;

Fig. 8 is a fragmentary side elevation enlarged of a portion of one of the standards 26, showing the manner in which the feed wheel 33 is mounted;

Fig. 9 is a top plan view partly in section of the stalk cutting mechanism;

Fig. 10 is a perspective view of the upper end of one of the standards 26 and one of the slides 27 and a portion of the rod 31;

Fig. 11 is a side elevation of the member 43 and the slide 42; and

Fig. 12 is a vertical sectional view through the slide 42 and the member 43 showing a portion of the feed roller 41 in elevation.

Referring to these figures, it will be seen that the frame of the machine consists of longitudinally extending bars 10, the rear ends of which are operatively supported upon a rear axle 11 and the forward ends of which are supported by means of wheels 12, these wheels being mounted upon an axle 13 in turn pivoted to a laterally projecting frame member 14. From the members 10 extend upward and rearward the supporting beams or bars 15, these beams or bars at their rear end being connected to the axle 11. Transverse braces will be provided wherever necessary in order to make the frame rigid.

Extending upward and rearward from the forward ends of the members 10, which members it will be noted extend a considerable distance forward of the wheels 12, are the vertically disposed guide bars 17. These guide bars 17 are disposed in such spaced relation that a row of plants will be accommodated between the guide bars. The lower ends of these guide bars 17 are connected to bars 10 by shoes 17ᵃ intended to travel close to the ground and the side bars act to pick up any plants which may be bent over and turn these plants into a vertical position. Disposed below the side bars are the upwardly extending endless carriers 18. The inner flights of these carriers are spaced from each other a certain distance to receive the plants between them and these endless carriers are mounted upon suitable sprocket wheels 19 at their lower ends and 20 at their upper ends. The sprocket wheels 20 have a particular construction which will be described later and these sprocket wheels 20 are mounted upon vertical shafts 21, the upper ends of which are mounted in suitable bearings which may be attached to the upper ends of the bars 17 or otherwise supported. The lower ends of the vertical shafts 21 may be supported in any suitable manner, as for instance in bearings mounted upon the member 21ᵃ, through which the shafts 21 pass. The shafts 21 are crank shafts and are driven as will be later stated. The lower ends of the shafts 21 are provided with sprocket wheels 22 and mounted upon the bars 10 in advance of the wheels 12 are the sprocket wheels 23. Passing over these sprocket wheels 22 and 23 are the endless carriers 24. The endless carriers 18 and 24 are provided with outwardly projecting teeth or fingers, indicated as 24ᵃ in both instances, which are intended to engage the stalks of the plant and, after the plant is cut, carry the plant upward and rearward. It will be noted that the carriers 24 do not extend forward as far as the carriers 18. Disposed to operate just below the forward ends of the carriers 24 is a reciprocating knife bar 25 carrying a knife 25ᵃ, operating between fixed knives 25ᵇ, which cuts the stalks of the plants relatively close to the ground. This knife is driven by means which will be later described. The sprocket chains 18 being flexible and having their inner flights relatively close together grip the corn stalks between them sufficiently to prevent the corn stalks from dropping.

Disposed behind the shafts 21 and extending upward from the supporting frame are the standards 26. Each of these standards supports at its upper end a bearing box 27, this bearing box being mounted to slide laterally on a lateral extension 28 of the standard 26. The bearing boxes are connected by a spring 29 so that they are normally urged toward each other but are free to move outward. The shafts 21 are provided at their upper ends with the cranks 30 and attached to these cranks are the rods 31 which extend rearward and pass through perforations in the boxes 27. As a consequence these rods 31 may reciprocate and at the same time the rear ends of the rods may be caused to diverge by the outward movement of the boxes 27 against the action of the spring 29. These rods 31 are formed with teeth 32 disposed in staggered relation to each other and these teeth are spaced a greater distance apart or are shorter at the rear ends of the rods 31 than at their forward ends. Disposed below the plane of the rods 31 is a corrugated guiding roller 33 whose trunnions are mounted in upwardly and rearwardly extending slots 34 formed in the standards 26. The lower ends of the shafts 21 are also provided with cranks 35 to which rods 36 are connected, these rods extending rearward and are disposed in boxes 37 likewise slidingly mounted on the standards and likewise drawn toward each other by a spring 38. The rods 36 are also provided with teeth like the teeth 32. It will be noted that the teeth 32 and 39 are approximately triangular in shape, one side of each tooth being perpendicular to the corresponding rod and the other side at an inclination thereto.

Disposed below the plane of the rods 36 are feeding rollers designated 40 and 41. The feeding roller 40 rotates in suitable fixed bearings but the feeding roller 41 is shiftable toward or from the roller 40. For this purpose the feeding roller 41 is mounted in slides 42, these slides being slidably mounted in a slotted frame 43. The slides are mounted upon the ends of a yoke 41ᵃ provided with a stem 44 surrounded by a compression spring 44ᵃ which urges the yoke and consequently the member 41, toward the roller 40. The purpose of yieldingly mounting the roller 42 is to permit the rollers separating or moving toward each other upon an increase or decrease in the amount or size of the stalks fed downward through these rollers. The rollers may be corrugated or otherwise formed so as to engage the stalks and feed them downward.

Disposed below the feeding rollers is a rotatable knife and blower fan. The rotatable knife and blower fan is disposed within a drum 45, this drum having an opening 46 by which the stalks are inserted into the drum. Extending from the drum is a conduit or trunk 47 leading laterally and then upward and then outward so that material blown from the casing 45 will be carried along this pipe or trunk and deposited in a wagon traveling along beside the machine. Disposed immediately above the opening 46 is a member 48 upon which is mounted a fixed knife 49. The shaft 50 of the fan extends into the drum 45 and carries upon it the fan blades 51 and also mounted in conjunction with these blades are the curved knives 52, illustrated as four in number. It will be seen that the stalks which are fed downward into the opening 46 will be sliced by means of the knives 52 and that the fan will blow or force the slices out through the fan casing into the pipe or trunk 47 to their place of deposit.

For the purpose of operating the mechanism heretofore described, a motor, as for instance an internal combustion engine designated 53, is mounted upon the rear axle in any suitable manner, the driving shaft of the motor being designated 54. Mounted in conjunction with the driving shaft 54 is a driven shaft 55 whereby power is transmitted from the motor to the operating mechanism on the machine. A clutch 56 is provided for operatively connecting or disconnecting this driven shaft 55 from the driving shaft 54. It is obvious that the driving shaft may be of any suitable form or construction. The shaft 55 carries upon it the beveled gear wheel 57 which engages with a beveled gear wheel 58 mounted upon the vertical shaft 50 which carries the blower blades 51 and the knives 52. The shaft 55 also carries upon it the beveled gear wheel 60 whereby power is transmitted through a beveled gear wheel 61 to a forwardly extending shaft 62 which carries upon it a worm 63 engaging with a worm wheel 64 mounted upon a transverse shaft 65. This transverse shaft carries upon it beveled gear wheels meshing with beveled gear wheels 66 mounted upon the lower ends of the crank shafts 21, thus driving these crank shafts and the sprocket chains 18 and 24. Mounted on the shaft 65 is a beveled gear wheel meshing with a beveled gear wheel 67 mounted upon the shaft 68 which extends down approximately parallel to the chain 24 and at its lower end carries a crank 69 (see Fig. 9) which through means of a pitman 70 engages with the reciprocating cutter bar 25. This cutter bar is operated in a guide 71.

For the purpose of driving the feed rollers 40 and 41, I mount upon the transverse shaft 65 a beveled gear wheel 72 which meshes with a beveled gear wheel 73 on a rearwardly extending shaft 74. This shaft, as shown in Fig. 1, carries upon it two slidable gears of different diameters and designated 75 and 75$^a$, these gears in turn meshing with gears having different diameters and designated 76 and 77 mounted upon a shaft 78 which extends rearward and carries a beveled gear 79 in turn meshing with a beveled gear wheel 80 carried upon the shaft of the feed roller 40. This shaft, as illustrated in Fig. 3, carries upon it a sprocket wheel 81 which, through the medium of the sprocket chain 82, drives the shaft 83 of the feed roller 41. As illustrated in Fig. 1, the sprocket chain 82 passes from the sprocket wheel 81 over an idler roller 84, then over the sprocket wheel 85 mounted on the shaft 83, and then over an idler sprocket wheel 86. The lower flight of the sprocket chain 82 between the idler sprocket 84 and the idler sprocket wheel 86 is approximately horizontal and this permits the feed roller 41 to be longitudinally shifted toward or from the feed roller 40.

Projecting from the laterally extending supporting member 14 or from the axle of the wheels 12 is a bracket 87 having a laterally projecting member 88 to which draft appliances are connected, as illustrated clearly in Fig. 2. It will thus be seen that the draft animals are disposed to one side of the line of cut. This line of cut covers a row designated A, while the horses are disposed on each side of a row designated B which has previously been cut.

As shown best in Figs. 4 and 5, the fan blades which are designated 51 are angular in form and carry the cutting knives 52 and in Fig. 5 I illustrate the means whereby the cutting knife 49 may be adjusted nearer to or farther from the cutting knives 52. As illustrated in Fig. 5, the cutting knife is connected by screws at one edge to the member 49 and passing through the member 48 is an adjusting screw 49$^a$ which bears upon the free edge of the knife. By turning this adjusting screw 49$^a$ the cutting edge of the knife may be forced more or less toward the curved knives 52. The amount of adjustment which is necessary or possible is exaggerated in Fig. 5 and it will be understood that this adjustment is relatively slight. It will be noted that the blower casing 45 is mounted between superposed bars 89 and 90 which are braced by a series of diagonal braces 91 and upon this compound beam so constructed, the engine 53 is mounted. This makes a rigid frame all around, the blower casing and this is necessary in order to overcome the resistance offered at the cutting bar and knives as the knives cut the corn or other stalks against the fixed cutting knife. A collar 92 may be attached to the shaft 50 to resist any lifting tendency on the part of the upper web of the blower casing. The under web of the blower casing is upwardly concave, which has a tendency to keep the ensilage toward the margin of the casing and also allows ample room for a ball bearing 93 on the lower bar 90, as illustrated in Fig. 3.

It will be seen that my machine is raised so as to work as close to the ground as may be and have sufficient clearance. It will further be seen that this machine covers a plurality of rows as it will be impractical to build this machine on a narrower frame that would work on one row only. The standard width of cultivator crops is from 3 ft. 4 in. to 3 ft. 6 in. and I have so designed my machine that the wheels carrying the weight of the machine will cover two rows, the row the machine is cutting and the stubble row to the left of the machine. The motor is mounted on the left side of the frame and this helps to balance the weight of the machine and eleminate side draft. The truck formed by the wheels 12 works along between the two rows covered by the machine.

The operation of the invention will be obvious from what has gone before. The machine is intended to be moved by draft animals across the field while the mechanism for lifting, cutting and slicing the corn stalks is operated preferably by the motor mounted upon the frame of the machine. As the machine moves over the field the inclined guide members 17 will lift any corn or other stalks which may be overturned and guide them into a vertical position and then the cutter 26 will operate to cut the stalks. The stalks will then be lifted by the inclined elevators 24 and 25 so that the lower ends of the stalks will be slightly below the plane of the reciprocating rods 36 and then the stalks will be fed rearward to a position against the roller and then allowed to drop downward onto the feeding rollers 40 and 41. These feeding rollers will draw the corn or other stalk downward against the rotating knives 52 which slice the plants and the slices will be deposited in the fan casing and thrown out of the fan casing by the rotatable fan and into the pipe 47 to be deposited in the car. Provision is made, as will be noted, for changing the speed of the feeding rollers and provision is also made for a lateral expansion of the rods 31 and of the rods 36 at their rear ends to allow for a mass of stalks gathering at the rear ends of these feeding rods. Provision is also made, as will be obvious, for the shifting of the feeding roller 41 toward or from the feeding roller 40 so as to accommodate a greater or smaller amount of stalks.

While I have illustrated a form of my invention which I believe to be thoroughly practical, I do not wish to be limited to the exact construction thereof as it is obvious that many changes might be made without departing from the spirit of the invention.

The particular means for supporting the upper ends of the sprocket chains 18 and 24 is illustrated in Fig. 6. As illustrated, the sprocket wheel 20 is formed of a rim and a central hub. The hub is connected to the shaft by gimbal joints 20ª and in turn connected to the rim by gimbal joints 20ᵇ. I do not wish to be limited to this construction, however, as other means for flexibly connecting the rim to the hub may be used which will permit the rim to maintain an angle to the shaft 21.

Having described my invention, what I claim is:

1. In a machine of the character described, a wheeled supporting frame, vertically disposed crank shafts mounted upon the frame, upper and lower pairs of rearwardly extending feeding rods operatively connected to the crank shafts, means at their rear ends for supporting said rods and permitting them to reciprocate, feeding teeth mounted on the rods, a pair of feeding rollers disposed below the lower set of feeding rods, rotatable slicing knives disposed below the rollers, a blower chest into which the sliced material is deposited, a blower in the chest for blowing the sliced material out therefrom, and means for cutting plants and lifting them vertically to carry their lower ends into position to be engaged by the lower set of feeding rods.

2. In a mechanism of the character described, a wheeled supporting frame, a pair of feeding rollers mounted upon the frame, one of the rollers being movable toward and from the other roller, a pair of vertically disposed crank shafts mounted upon the frame in advance of the feeding rollers and having upper and lower cranks, feeding rods connected to the upper cranks and to the lower cranks, these rods having inwardly projecting teeth, means for slidingly supporting the rear ends of said feeding rods and permitting the rear ends to spread laterally, downwardly inclined guides mounted upon the frame and extending from the upper ends of said vertical shafts downward and forward, a pair of endless elevators disposed in lateral spaced relation below the guiding members and having teeth, said endless elevators extending upward and rearward, a pair of endless elevators disposed with their upper ends adjacent the lower ends of the vertical shafts and extending downward and forward, said elevators being laterally spaced and being provided with teeth, a cutter mounted at the forward end of the last named endless elevators, and means for operating the elevators, rotating said crank shafts, and operating the feeding rollers.

3. In a machine of the character described, a pair of upwardly extending crank shafts having cranks, a pair of upwardly extending standards, bearings slidingly mounted in the standards, springs drawing said bearings toward each other, parallel rods attached to the crank shafts and projecting through the bearings, and teeth mounted upon the rods directed toward each other and operatively engaging the plants so as to shift the plants rearward as the rods reciprocate.

4. In a machine of the character described, a wheeled supporting frame, upwardly extending crank shafts mounted upon the frame, reciprocating feeding bars connected to the crank shafts, forwardly extending supporting bars, sprocket wheels mounted at an upward and rearward inclination to a horizontal plane upon said supporting bars, sprocket wheels mounted upon the crank shafts and having rims flexibly connected to the hubs of the sprocket wheels, sprocket chains passing over the last named sprocket wheels and downward around the first named sprocket wheels at an inclination to the horizontal, and teeth carried upon said sprocket chains.

5. In a machine of the character described, a supporting frame, upwardly and rearwardly extending guide bars mounted thereon, a pair of vertically extending shafts mounted upon the supporting frame, the guide bars terminating at the upper ends of said shafts, each of said shafts having a pair of cranks formed thereon, an upper pair of upwardly and rearwardly extending toothed sprocket chains operatively supported on the frame having their inner flights spaced from each other and disposed beneath the guide bars, a lower pair of upwardly and rearwardly extending toothed sprocket chains extending parallel to the first named chains and having their lower ends disposed on a level with the lower ends of the first named chains, sprocket wheels mounted upon the vertical shafts and over which sprocket chains pass, means for driving said shafts, and upper and lower pairs of feed bars, each connected at one end to one of said cranks, the feed bars being slidingly supported at their rear ends and said feed bars receiving material from the upper ends of said sprocket chains and carrying said material rearward, and means disposed below the rear ends of said feed bars for slicing the material and carrying it laterally.

6. In a machine of the character described, a rear axle, a supporting frame extending forward and downward from the rear axle and then extending horizontally forward, a forward truck supporting the forward portion of said frame, vertically disposed crank shafts mounted upon the frame and having upper and lower cranks, toothed feed bars connected to said cranks and extending rearward therefrom and reciprocated by the cranks, a pair of spaced guide bars extending downward from the upper ends of the cranks to the forward end of said supporting frame, a pair of toothed sprocket chains operatively mounted at their lower ends upon said frame, extending parallel to the guide bars and operatively mounted at their upper ends upon the crank shafts, a pair of lower toothed sprocket chains operatively mounted at their upper ends upon the lower ends of the crank shafts and at their lower ends upon the supporting frame, means disposed just forward of the rear axle for feeding material downward, and means disposed below said feeding means for slicing the material.

7. In a machine of the character described, a supporting frame including a rear axle, upwardly extending standards mounted on the rear axle, vertically extending crank shafts operatively supported upon the frame and spaced from each other, upper and lower feed bars operatively connected to the cranks of the crank shafts and having sliding engagement in said standards, guide bars extending downward from the upper ends of the crank shafts, upper and lower sprocket chains operatively mounted at their lower ends upon the supporting frame and at their rear ends operatively engaged with the crank shafts, a pair of feed rollers above which said feed rods operate, a series of rotatable cutting knives and fan blades mounted below the feed rollers, a blower casing mounted upon the rear axle and inclosing said fan blades and cutting knives and having a discharging trunk, a motor mounted upon the rear axle, stalk cutting devices reciprocatingly mounted upon the main frame adjacent the forward lower ends of the lower pair of sprocket chains, means operatively connected to the shaft of the motor for driving said cutting devices, means operatively connected to said shaft for driving the crank shafts, means for driving the feed roller shafts from the drive shaft, means operatively connected to the drive shaft for rotating said cutting blades and fan blades, and means for disconnecting the several mechanisms from the motor.

In testimony whereof I hereunto affix my signature in the presence of two witnesses.

JOSEPH F. HEALY.

Witnesses:
  O. A. ANDERSON,
  GRACE HALL.